United States Patent
Gupta et al.

(10) Patent No.: US 8,380,085 B2
(45) Date of Patent: Feb. 19, 2013

(54) HIGH-SPEED MULTI-LEVEL ELECTRONIC SIGNAL GENERATION FOR OPTICAL COMMUNICATIONS

(75) Inventors: Shalabh Gupta, Mumbai (IN); Yue-Kai Huang, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 251 days.

(21) Appl. No.: 12/694,483

(22) Filed: Jan. 27, 2010

(65) Prior Publication Data

US 2011/0052209 A1    Mar. 3, 2011

Related U.S. Application Data

(60) Provisional application No. 61/238,411, filed on Aug. 31, 2009.

(51) Int. Cl.
*H04B 10/04* (2006.01)

(52) U.S. Cl. ........ 398/186; 398/183; 398/188; 398/193; 398/194; 359/245; 359/237; 359/238; 385/2; 385/3; 385/8; 375/286; 375/287; 375/289

(58) Field of Classification Search .......... 398/186, 398/188, 183, 79, 75, 102, 161, 158, 159, 398/160, 192, 193, 194, 195, 196, 197, 141, 398/81; 359/237, 238, 239, 245; 385/2, 385/3, 8, 24; 375/286, 287, 289, 292

See application file for complete search history.

(56) References Cited

U.S. PATENT DOCUMENTS

| | | | | |
|---|---|---|---|---|
| 6,744,546 | B2 * | 6/2004 | Nakamura et al. | 359/237 |
| 7,307,569 | B2 * | 12/2007 | Vrazel et al. | 341/144 |
| 7,558,487 | B2 | 7/2009 | Liu et al. | |
| 2004/0021829 | A1 | 2/2004 | Griffin | |
| 2005/0047791 | A1 * | 3/2005 | Miyazaki | 398/147 |
| 2005/0226623 | A1 * | 10/2005 | Pincemin | 398/98 |
| 2009/0257755 | A1 * | 10/2009 | Buelow | 398/184 |
| 2010/0183309 | A1 * | 7/2010 | Etemad et al. | 398/79 |
| 2010/0329696 | A1 * | 12/2010 | Yu et al. | 398/188 |

* cited by examiner

*Primary Examiner* — Hanh Phan
(74) *Attorney, Agent, or Firm* — Joseph Kolodka

(57) ABSTRACT

A method of processing data is provided that includes receiving a plurality of binary electronic signals and generating an optical signal by a number of lasers that is equal to or greater than the number of binary electronic signals. The optical signal is generated at one of a plurality of intensity levels, and each intensity level represents a particular combination of bit values for the plurality of binary electronic signals. The optical signal is converted into an electronic signal having the plurality of intensity levels. An apparatus for processing data is provided that includes a plurality of lasers configured to emit light at a plurality of frequencies, and a plurality of modulators configured to receive a plurality of binary electronic signals and to modulate the light emitted by the lasers. An apparatus for transmitting data is provided that includes a photo receiver and an electronic signal generator.

15 Claims, 6 Drawing Sheets

HIGH-SPEED MULTI-LEVEL ELECTRONIC SIGNAL GENERATION FOR OPTICAL COMMUNICATIONS

This application claims the benefit of U.S. Provisional Application No. 61/238,411 filed Aug. 31, 2009, which is incorporated herein by reference.

FIELD OF THE INVENTION

The present invention relates generally to data transmission methods and devices, and in particular to a method and system for transmitting binary data using multi-level optical signals.

BACKGROUND OF THE INVENTION

Generating multi-level high-speed electronic signals is difficult. Typically, integrated circuits such as digital-to-analog converters (DACs) are used to perform this task. However, present day high-speed DACs cannot operate beyond ~10-GHz bandwidth. Obtaining multi-level electronic signals using a passive combination of multiple signal streams, with binary modulation in each, is also very challenging because of the unavailability of high-quality broadband electronic components.

To overcome this problem, high-speed binary (digital) signals can be combined using broadband passive combiners after precise delay and amplitude adjustments. In this manner, binary signals can be generated at faster speeds. However, broadband combiners and delay elements that are required to accomplish this task are difficult to fabricate, and therefore expensive, because of stringent impedance matching requirements. Small amounts of impedance mismatches can result in signal reflections that can severely degrade the quality of the generated signal, and perhaps make it useless.

SUMMARY OF THE INVENTION

The present invention uses photonics to overcome the limitations of electronics. A binary data sequence is modulated over a continuous-wave (CW) optical carrier, using an intensity modulator. In the optical domain, this signal may be considered "narrow-band", since the bandwidth is much smaller than the optical carrier frequency. Therefore, it may be much easier to perform delay, amplitude adjustment and combination operations in the optical domain.

A plurality of such binary modulated optical signals, with sufficiently separated carrier frequencies, can be combined with precise delays and magnitudes. A high-speed photo-receiver can be used to convert this combined optical signal back to the electrical domain to obtain the desired multi-level electronic signal.

A method of processing data is provided that includes receiving a plurality of binary electronic signals and generating an optical signal by a number of lasers that is equal to or greater than the number of binary electronic signals. The optical signal is generated at one of a plurality of intensity levels, and each intensity level represents a particular combination of bit values for the plurality of binary electronic signals.

A method of transmitting data is provided that includes generating an optical signal having one of a plurality of intensity levels. Each intensity level represents a particular combination of bit values for a plurality of binary electronic signals. The optical signal is generated by a number of lasers that is equal to or greater than a number of the plurality of binary electronic signals. The method further includes converting the optical signal into an electronic signal having the plurality of intensity levels.

An apparatus for processing data is provided that includes a plurality of lasers configured to emit light at a plurality of frequencies, and a plurality of modulators configured to receive a plurality of binary electronic signals and to modulate the light emitted by the lasers. The apparatus further includes a power combiner configured to combine the modulated light into an optical signal. The optical signal is configured to have one of a plurality of intensity levels, and each intensity level is configured to represent a particular combination of bit values for the plurality of binary electronic signals.

An apparatus for transmitting data is provided that includes a plurality of modulators configured to receive a respective plurality of binary electronic signals, and a plurality of lasers configured to emit light at a plurality of frequencies. A number of the lasers corresponds to the number of the modulators, and the light emitted by the plurality of lasers is modulated by the modulators. The apparatus further includes a power combiner configured to combine the modulated light into an optical signal. The optical signal is configured to have one of a plurality of intensity levels, and each intensity level is configured to represent a particular combination of bit values for the plurality of binary electronic signals. The apparatus also includes a photo receiver configured to receive the optical signal having the plurality of intensity levels, and an electric signal generator configured to output an electronic signal having the plurality of intensity levels.

These and other advantages of the invention will be apparent to those of ordinary skill in the art by reference to the following detailed description and the accompanying drawings.

DETAILED DESCRIPTION

Generating more than 10-GHz electronic signals with four or more amplitude levels is difficult. The technique according to the present invention generates high frequency electronic signals with four or more levels. All components required for accomplishing this task using the present invention are available commercially.

As a result, optical links with advanced modulation formats such as 16-QAM (Quadrature Amplitude Modulation) or 64-QAM can be implemented with high baud rates, enabling highly bandwidth efficient optical links with greater than 100 Gbps data rates per wavelength channel.

The invention is aimed at generating high bit-rate optical signals with advanced modulation formats such as quadrature amplitude modulation (for example, 16-QAM or 64-QAM) at greater than 10-Gbaud/sec. The method combines high-speed electronic signals using photonics. In general, signals can be combined in the electrical domain. However, broad-bandwidth makes it difficult to combine these signals electronically. The present method and system first converts the broadband electronic signals to the optical domain, then combines them in the optical domain, and then converts the signals back to the electrical domain. The steps that make this technique beneficial involve converting the signal to the optical domain and combining the signal optically with precise delays and attenuation. The signals of interest are 'baseband' signals in the electrical domain and have very broad bandwidths that cannot be handled easily by electronic components. However, the same signals become narrow band when modulated over an optical carrier, in the optical domain. Hence attenuation, combining and delay operations can be performed more easily.

Figure 1:
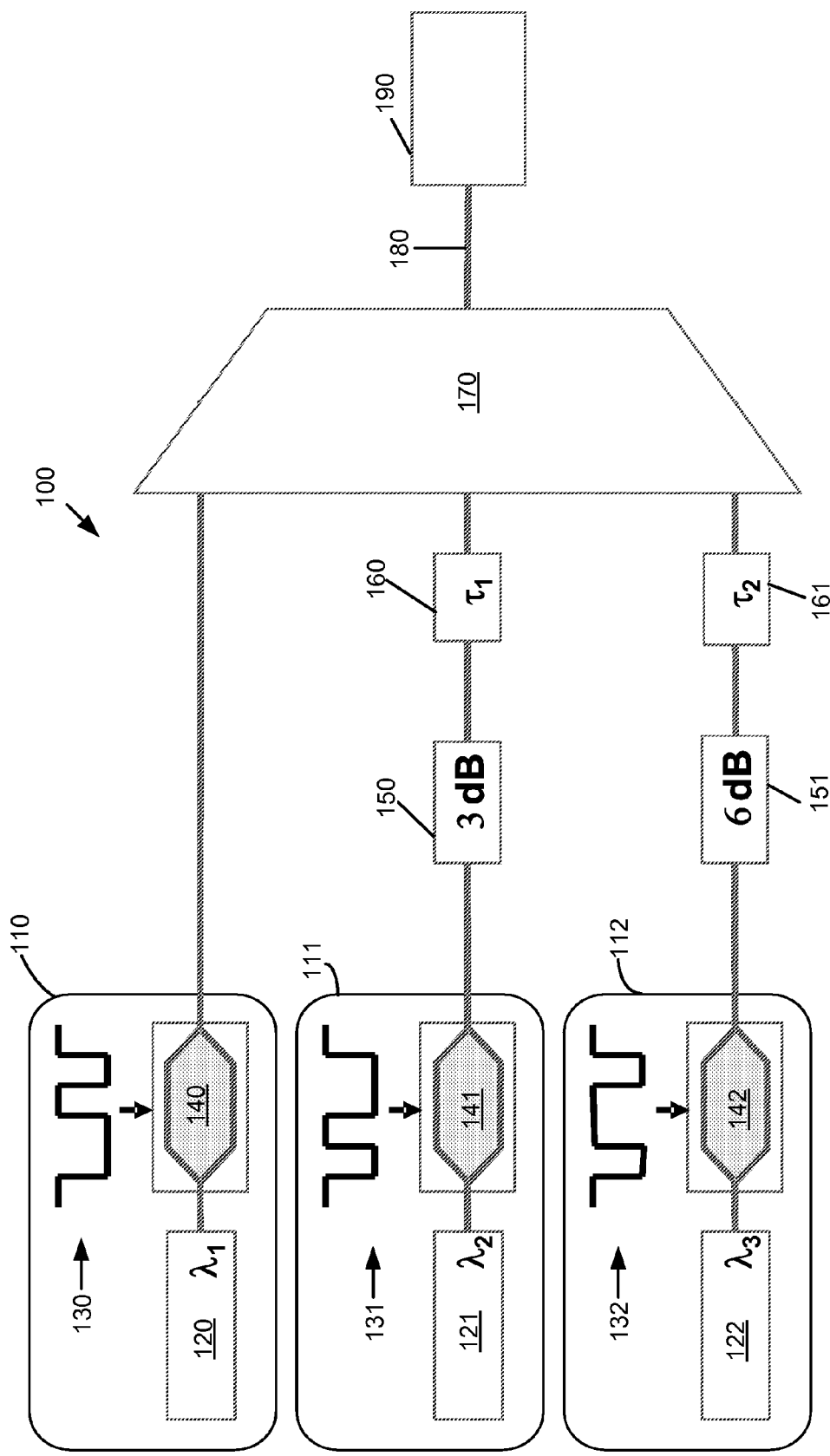
FIG. 1 illustrates an apparatus according to an exemplary embodiment.

FIG. 1 illustrates an exemplary system for processing data using multiple lasers transmitting an optical signal having multiple levels of intensity. System 100 includes subsystem 110, subsystem 111, and subsystem 112. Subsystem 110 includes laser 120 outputting light at a frequency $\lambda_1$. Laser 120 outputs light to modulator 140, which may be a Mach-Zehnder Modulator (MZM). The MZM, or any other intensity modulator, is used to modulate these optical signals with the binary electronic signal data streams.

Electronic binary signal 130 is input into modulator 140. Electronic binary signal 130 may be binary data representing information. Electronic binary signal 130 operates to cause modulator 140 to absorb or block the light output of laser 120, and alternately to transmit or allow passage of the light output of laser 120. In like manner, subsystem 111 includes laser 121, outputting light at a frequency $\lambda_2$, and modulator 141 receiving an input of electronic binary signal 131. Subsystem 112 includes laser 122, outputting light at a frequency $\lambda_3$, and modulator 142 receiving an input from electronic binary signal 132.

The output of subsystem 110 is modulated light which is transmitted to power combiner 170. The output of subsystem 111 is modulated light which is transmitted to attenuator 150. Attenuator 150 may operate to adjust the intensity of the modulated light, and in one embodiment reduces the intensity of the light by 3 decibels. The attenuation provided by attenuator 150 may be adjusted in an initial calibration operation, and may subsequently be static. Different laser sources are thereby given different weights that are adjustable by variable attenuators. The first attenuated light beam may have ½ the power of the unattenuated light beam, and the second attenuated light beam may have ½ the power of the first attenuated light beam. In this manner, the three light beams may define 8 distinct intensity levels which uniquely determine the values of the original signals. An attenuator for at least one of the plurality of lasers is configured to adjust an intensity of the modulated light from the respective laser to define the plurality of intensity levels for the optical signal.

The light beam output from attenuator 150 may be transmitted to time-delay 160, which may introduce a delay of $\tau_1$. The delay provided by time-delay 160 may operate to synchronize the transitions between intensity levels in order to improve the definition of the signal and reduce transition time. In a similar manner, subsystem 112 may output a light beam to attenuator 151, which operates to reduce the intensity of the light. In particular, the light may be reduced by 6 decibels. From attenuator 151, the light beam is transmitted to time delay 161, which may introduce a delay of $\tau_2$, and which may operate in a similar manner to time delay 160 to synchronize the transitions between intensity levels. The delays for each laser source are adjusted so that the data edges from all the channels are aligned in time.

From time delay 160 and time delay 161, the respective light beams are transmitted to power combiner 170. These modulated laser sources are then combined using an optical power combiner. Power combiner 170 operates to combine all three light beams into a single optical signal 180, which may be transmitted on an optical fiber. A delay adjuster for at least one of the plurality of lasers is configured to adjust a relative delay of the modulated light from the respective laser to define transitions between different intensity levels in the optical signal.

Figure 4:
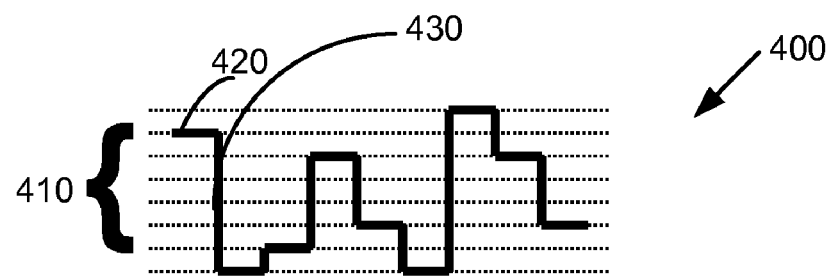
FIG. 4 illustrates a multi-level signal according to an exemplary embodiment.

After transmission, optical signal 180 is received by photo receiver 190. Photo receiver 190 receives a multi-level input, which has $2^N$ power levels, where N is the number of lasers. To generate $2^N$ power levels, N different CW (continuous-wave) laser sources are used, each with a different wavelength. In the apparatus, a number of the lasers is equal to or greater than a number of binary electronic signals, and each wavelength of each of the plurality of lasers is separated from an adjacent wavelength by a respective frequency separation. In this manner, each of the high-speed binary electronic signals 130, 131, and 132 may be transmitted in one optical signal 180. Photo receiver 190 may convert the optical signal into a multi-level high-speed binary electronic signal. The output produced by photo receiver 190 is illustrated in FIG. 4.

The combined optical signal is converted to electrical domain by a photo-receiver (or a photo-detector), generating the desired multi-level signal. The frequency spacing between different lasers may be sufficiently large (i.e., larger than the bandwidth of the photo-receiver), to ensure that the beat components between different lasers are absent in the electrical domain signal. The first wavelength channel typically does not need an adjustable attenuator or a delay stage since the intensity outputs of the other two channels can be adjusted relative to the power and timing in this channel. All of the respective frequency separations are greater than a bandwidth sensitivity of a photo receiver (also referred to as a threshold sensitivity) configured to receive the optical signal.

Figure 2:
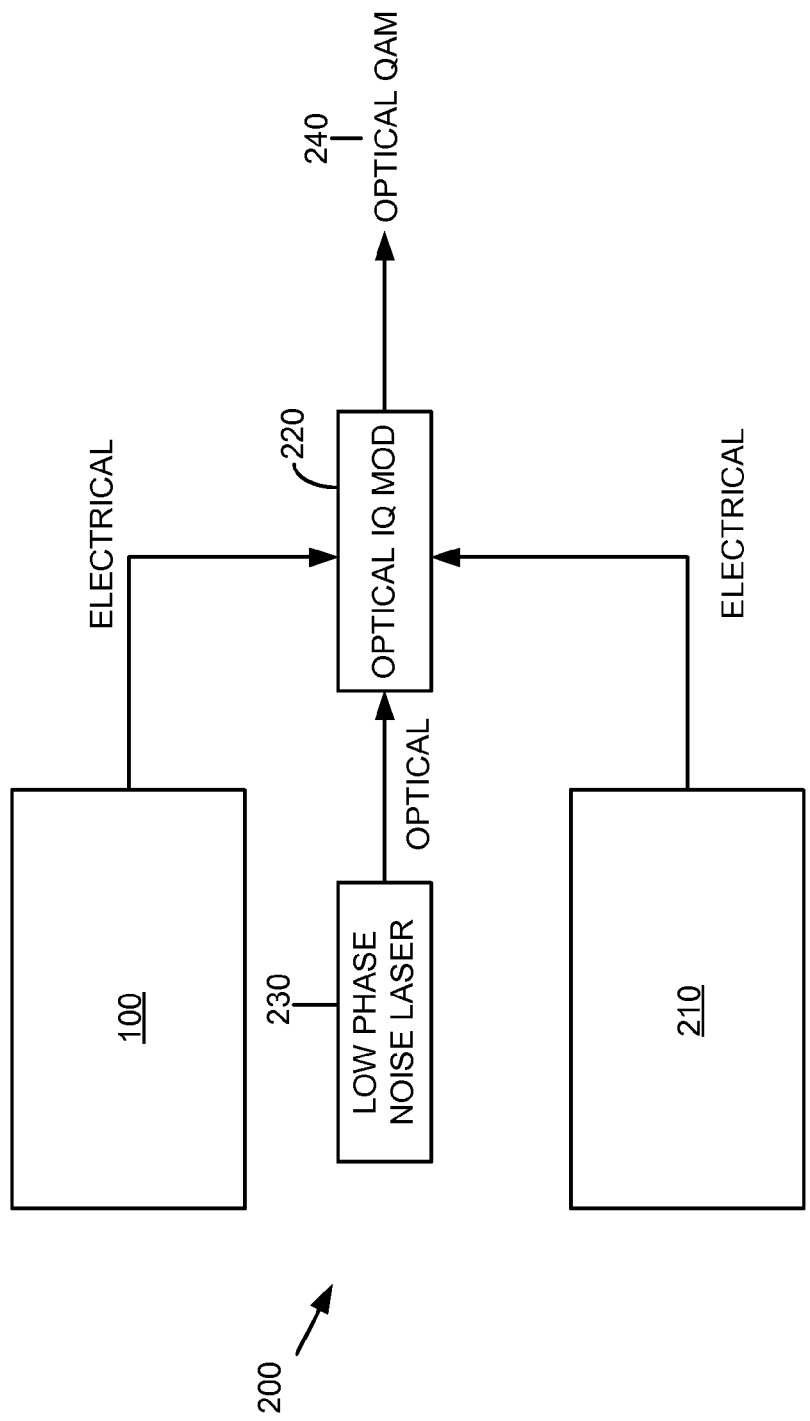
FIG. 2 illustrates a system according to an exemplary embodiment.

FIG. 2 illustrates an exemplary system according to an exemplary embodiment. System 200 includes system 100 shown in FIG. 1. System 100 outputs a high-speed multi-level electronic signal. System 210 may be similar or identical to system 100, and may also therefore output a high-speed multi-level electronic signal. The output of system 100 and system 210 may be input into optical In-phase/Quadrature (IQ) modulator 220. Optical IQ modulator 220 may modulate an optical signal output from low phase noise laser 230. Optical IQ modulator 220 may output a quadrature amplitude modulated optical signal, optical QAM signal 240. QAM signal 240 may encode the plurality of binary electronic signals. Optical QAM signal 240 may therefore carry six binary signals, representing three binary signals input into system 100 and three binary signals input into system 210. Optical QAM signal 240 may therefore have $2^6$ IQ values, and may therefore represent a 64 QAM signal. Optical QAM signal 240 is shown in FIG. 6.

The requirements for the laser used for QAM modulation depends on the constellation size, and additionally may depend on baud-rate and/or receiver sensitivity. The larger the constellation, the less phase noise can be tolerated from the laser. The phase noise is linked to the line-width of the laser. For example, a 100 kHz line-width laser may work well for 16-QAM modulation, while a 64-QAM modulation may require laser line-width to be less than 10 KHz to achieve the same performance. The modulated signal may occupy about the same bandwidth as the original binary data. Therefore, the more levels that can be generated and detected, the more spectrally efficient the transmission can be.

A further electric signal generator may output a further electronic signal having a further plurality of intensity levels. The further electronic signal may be received by the optical IQ modulator, and the further electronic signal may represent a further particular combination of bit values for a further plurality of binary electronic signals. The optical IQ modulator may modulate the low phase noise laser with the further electronic signal to form the quadrature amplitude modulated optical signal. The quadrature amplitude modulated optical signal may encode the further plurality of binary electronic signals.

Figure 6:
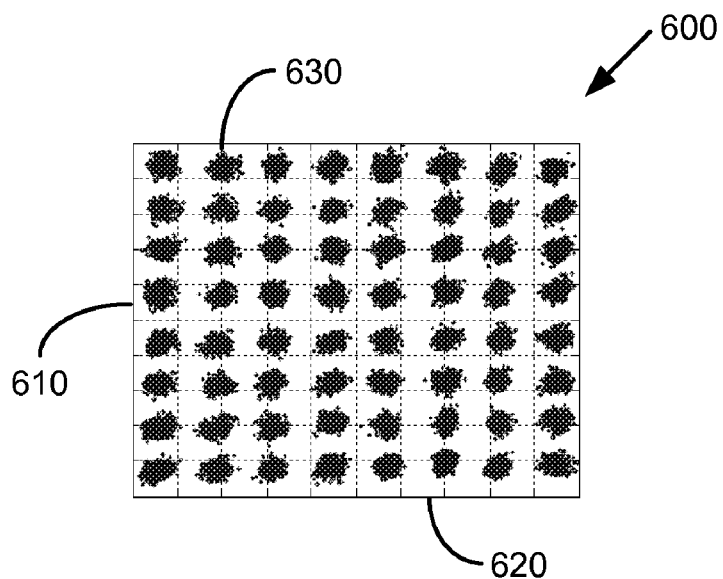
FIG. 6 illustrates a quadrature amplitude modulated test signal according to an exemplary embodiment.

FIG. 6 illustrates a test output for a 64 QAM signal, representing an overlay of all possible signals for a 64 QAM signal, and thereby illustrating the signal quality of a 64 QAM signal. In particular, FIG. 6 illustrates graph 600, which includes Y axis 610 and X axis 620. Y axis 610 may illustrate an I or a Q component of a signal. X axis 620 may illustrate an I or a Q component of a signal corresponding to the component not shown in Y axis 620. The combined IQ value may have 64 possible values, including representative IQ value 630. Graph 600 therefore represents an overlay of all possible signals for a 64 QAM signal.

Figure 3:
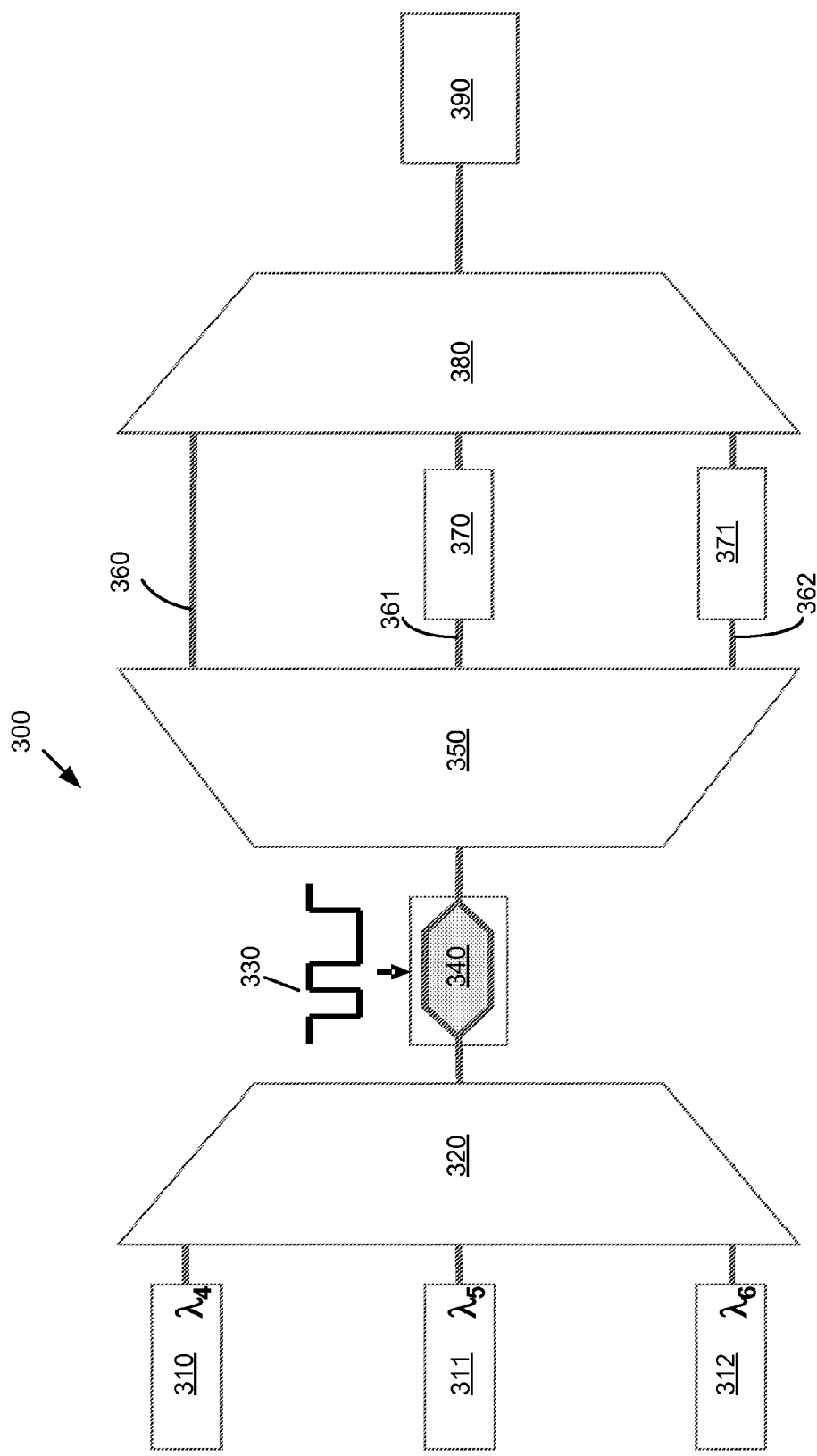
FIG. 3 illustrates a testing apparatus according to an exemplary embodiment.

For generating a pseudo-random multi-level signal for testing purposes, the system of FIG. 1 can be simplified and only one Mach-Zehnder modulator is required, as shown in FIG. 3. FIG. 3 illustrates system 300 including lasers 310, 311 and 312. Lasers 310, 311 and 312 output light having different frequencies, namely $\lambda_4$, $\lambda_5$ and $\lambda_6$, which may or may not be the same frequencies represented by $\lambda_1$, $\lambda_2$ and $\lambda_3$ in FIG. 1. Light beams output from lasers 310, 311 and 312 are transmitted to power combiner 320, which combines the three light outputs. The combined light is modulated by modulator 340. Test signal 330 is a high-speed binary electronic signal that is input into modulator 340. High-speed binary electronic test signal 330 may be a pseudo-random bit sequence. The output of modulator 340 is transmitted to wavelength demultiplexer 350 (also referred to herein as wavelength demux 350). Wavelength demux 350 may for example be an arrayed waveguide grating. The output of wavelength demux 350 is three light outputs having different frequencies. The different frequencies of the light outputs may be the same frequencies as the outputs of lasers 310, 311 and 312. For instance, light beam 360 may be at the same frequency as the light beam output from laser 310. Likewise, light beam 361 may be the same frequency as the light beam output from laser 311, and light beam 362 may be the same frequency as the light beam output from laser 312. Light beam 361 is transmitted to a combined attenuator time delay 370.

Combined attenuator time delay 370 operates to attenuate the intensity of light beam 361, and in particular may attenuate the intensity by 3 decibels. Additionally, combined attenuator time delay 370 may delay the signal transmitted on light beam 361. The delay introduced by combined attenuator time delay 360, $\tau_3$, may be more than one integer cycle of the binary signal in order to avoid having the same bit steam at the same time for light beam 360 and light beam 361. Light beam 362 may be transmitted to combined attenuator time delay 371. Combined attenuator time delay 371 may reduce the intensity of light beam 362, and in particular may attenuate the light beam by 6 decibels. Combined attenuator time delay 371 may also delay the signal transmitted on light beam 362 by $\tau_4$, which may be more than one integer cycle of the binary signal. In particular, the time delay $\tau_4$ may be more than two integer cycles. In this case, the delays $\tau_3$ and $\tau_4$ must be sufficiently large and different from each other to ensure that the combined bit streams (in the optical domain) are uncorrelated.

Figure 5:
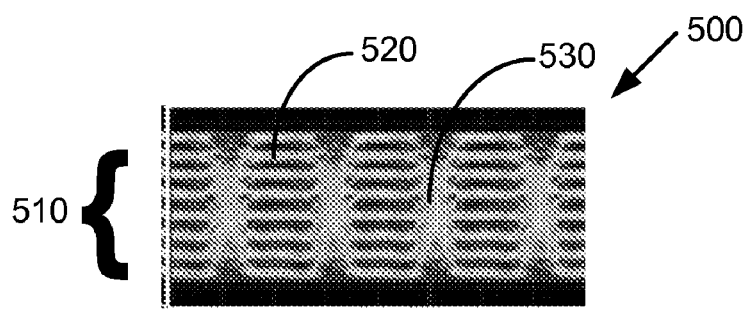
FIG. 5 illustrates a multi-level test signal according to an exemplary embodiment.

Light beam 360 and the outputs of combined attenuator time delays 370 and 371 are input into power combiner 380. Power combiner 380 outputs an optical signal through an optical fiber. The optical signal transmitted through the optical fiber is transmitted to photo receiver 390. The results of tests conducted on system 300 provide a signal similar to that shown in FIG. 4. An overlap of several of the signals transmitted to and received by photo receiver 390 may provide the test signal shown in FIG. 5, which may illustrate the efficacy of the apparatus and method for creating a multi-level electronic signal. FIG. 5 illustrates an output of test system 300 that is superimposed to illustrate the separation between intensity levels. In particular, test signal 500 includes levels 510, including eight levels. Signal level 520 is shown as superimposed on the other seven intensity levels. Each intensity level is separated from an adjacent intensity level by transition 530.

FIGS. 4 and 5 show the electronic signals generated by systems 100 and 300 with eight levels since three lasers are used. The number of lasers N may correspond to the number of binary signals, and the number of levels in signal produced may be $2^N$. The examples presented herein having three electronic binary signals being combined into one optical signal, and then being converted into one high-speed multi-level electronic signal, are exemplary only. More or fewer signals and levels are possible than are shown.

FIG. 4 illustrates a multi-level signal 400 which may represent an optical signal input into photo receiver 190 or an electronic signal output from photo receiver 190. Multi-level electronic signals may have levels 410, which may be equal to $2^N$, where N equals the number of lasers, and/or the number of high-speed binary electronic signals being input. In FIG. 4, multi-level signal 400 includes eight levels, and therefore may be produced by three lasers. Multi-level signal 400 may include signal level 420 and transition 430.

Figure 7:
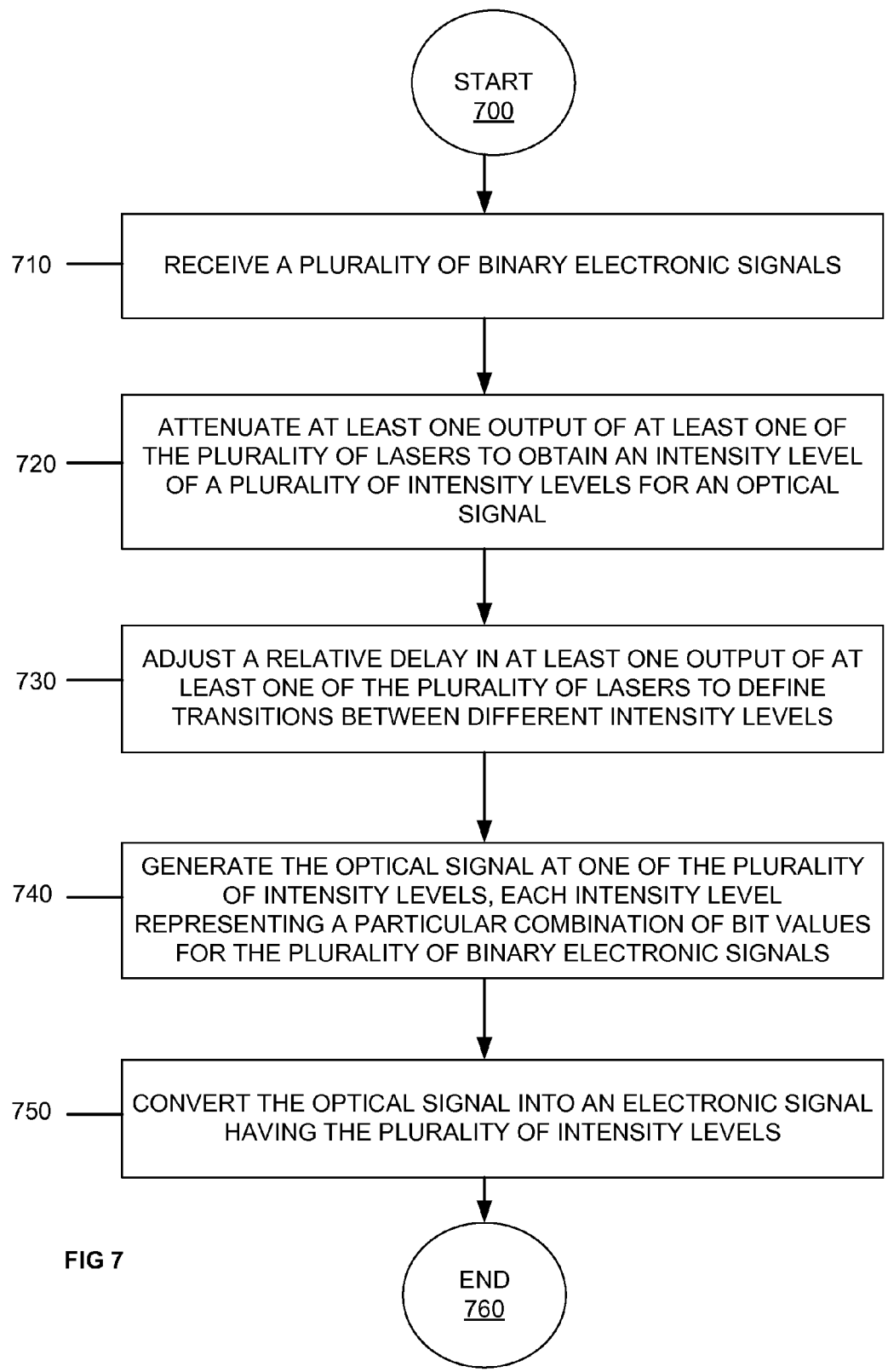
FIG. 7 illustrates a method according to an exemplary embodiment.

FIG. 7 illustrates an exemplary method according to an embodiment of the present invention. The flow in FIG. 7 starts at start circle 700 and flows to operation 710, which indicates to receive a plurality of binary electronic signals. The plurality of binary electronic signals may correspond to electronic signals 130, 131, and 132 of FIG. 1. From operation 710, the flow proceeds to operation 720, which indicates to attenuate at least one output of at least one of the plurality of lasers to obtain an intensity level of a plurality of intensity levels for an optical signal. Operation 720 may be performed by attenuators 150 and 151 of FIG. 1 from operation 720, the flow proceeds to operation 730, which indicates to adjust a relative delay in at least one output of at least one of the plurality of lasers to define transitions between different intensity levels. Operation 730 may be performed by time delays 160 and 161 of FIG. 1. From operation 730, the flow proceeds to operation 740, which indicates to generate an optical signal at one of the plurality of intensity levels. The optical signal generated in operation 740 may correspond to optical signal 180 of FIG. 1. Each intensity level represents a particular combination of values for the plurality of binary electronic signals in operation 710. From operation 740, the flow proceeds to operation 750, which indicates to convert the optical signal into an electronic signal having the plurality of intensity levels. From operation 750, the flow proceeds to end circle 760. In the flow of FIG. 7, operations 720, 730 and 750 may be optional steps.

Figure 8:
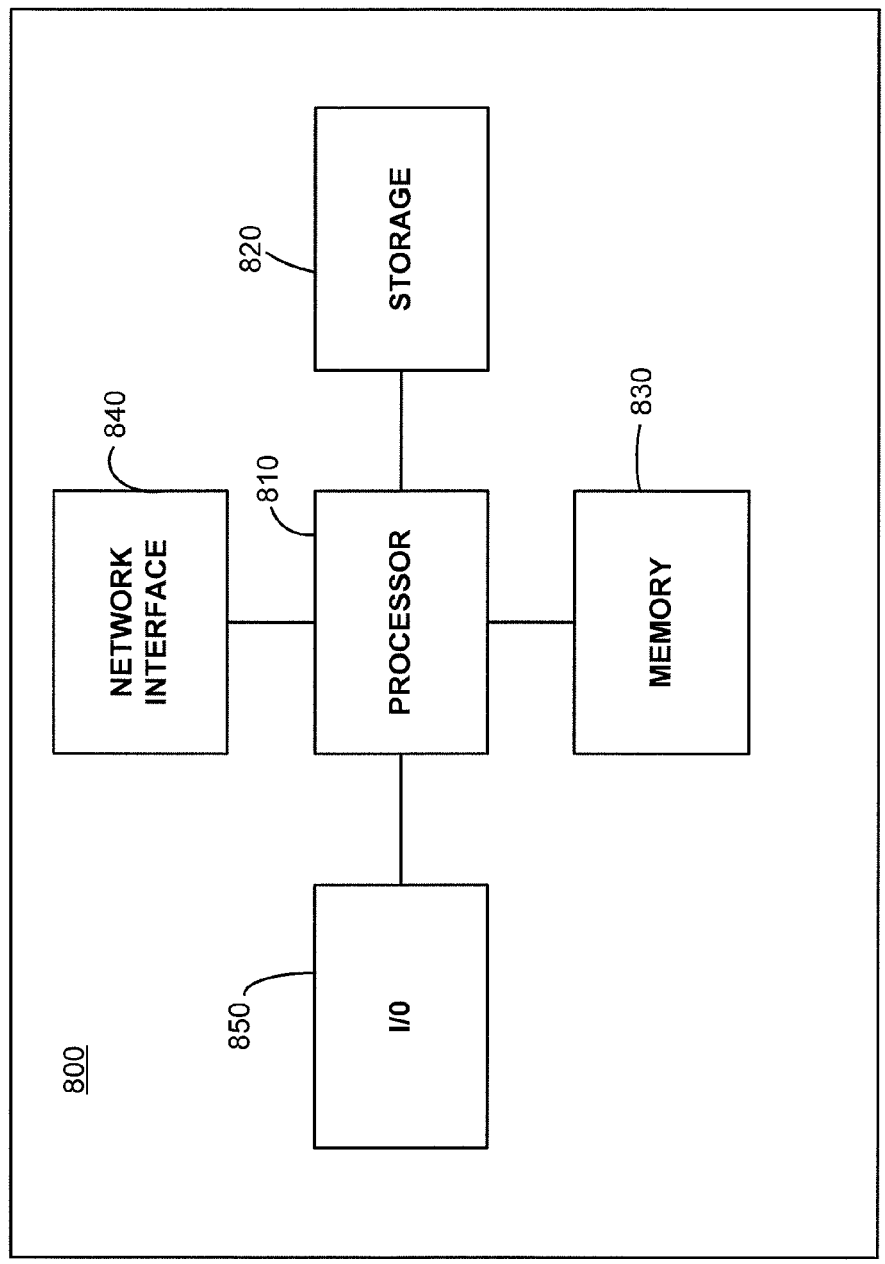
FIG. 8 is a block diagram of a computer in accordance with an exemplary embodiment.

FIG. 8 is a high level block diagram of a computer in accordance with an embodiment of the present invention. Computer 800 can, for example, operate modulators 140, 141 and 142, or may output electronic binary signals 130, 131 and 132 in FIG. 1. Additionally, computer 800 can perform the steps described above by, for example, controlling the attenuation or time delay shown in operations 720 and 730, respectively, of FIG. 7. Computer 800 contains processor 810 which controls the operation of computer 800 by executing computer program instructions which define such operation, and which may be stored on a computer-readable recording medium. The computer program instructions may be stored in storage 820 (e.g., a magnetic disk, a database) and loaded into memory 830 when execution of the computer program instructions is desired. Thus, the computer operation will be defined by computer program instructions stored in memory 830 and/or storage 820 and computer 800 will be controlled by processor 810 executing the computer program instructions. Computer 800 also includes one or more network interfaces 840 for communicating with other devices, for example other computers, servers, or websites. Network interface 840 may, for example, be a local network, a wireless network, an intranet, or the Internet. Computer 800 also includes input/output 850, which represents devices which allow for user interaction with the computer 800 (e.g., display, keyboard, mouse, speakers, buttons, webcams, etc.). One skilled in the art will recognize that an implementation of an actual computer will contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method of processing data, comprising:
   receiving a plurality of binary electronic signals;
   generating an optical signal by a plurality of first lasers,
   wherein the number of the plurality of first lasers is equal to or greater than the number of the plurality of binary electronic signals,
   wherein the optical signal is generated at one of a plurality of intensity levels, and wherein each intensity level represents a particular combination of bit values for the plurality of binary electronic signals;
   converting the optical signal into an electronic signal having the plurality of intensity levels; and
   inputting the electronic signal into an optical IQ (In-phase/Quadrature) modulator,
   wherein the optical IQ modulator modulates a second laser with the electronic signal to form a quadrature amplitude modulated optical signal.

2. The method of claim 1,
   wherein each wavelength of the plurality of first lasers is separated from an adjacent wavelength by a respective frequency separation, and
   wherein all of the respective frequency separations are greater than a bandwidth sensitivity of a photo receiver receiving the optical signal.

3. The method of claim 1,
   wherein the generating of the optical signal further comprises:
   combining outputs of the plurality of first lasers.

4. The method of claim 1, further comprising:
   attenuating at least one output of the plurality of first lasers.

5. The method of claim 1, further comprising:
   adjusting a relative delay of at least one output of the plurality of first lasers.

6. A method of transmitting data, comprising:
   generating an optical signal having one of a plurality of intensity levels,
   wherein each intensity level represents a particular combination of bit values for a plurality of binary electronic signals,
   wherein the optical signal is generated by a plurality of first lasers, and
   wherein the number of the plurality of first lasers is equal to or greater than the number of the plurality of binary electronic signals;
   converting the optical signal into an electronic signal having the plurality of intensity level; and
   inputting the electronic signal into an optical IQ (In-phase/Quadrature) modulator,
   wherein the optical IQ modulator modulates a second laser with the electronic signal to form a quadrature amplitude modulated optical signal.

7. The method of claim 6,
   wherein the converting is performed by a photo receiver having a bandwidth sensitivity,
   wherein each first laser emits light having a wavelength separated from an adjacent wavelength by a respective frequency separation, and
   wherein each of the respective frequency separations is greater than the bandwidth sensitivity.

8. The method of claim 6, further comprising:
   inputting a further electronic signal into the optical IQ modulator,
   wherein the further electronic signal represents a further particular combination of bit values for a further plurality of binary electronic signals, and
   wherein the optical IQ modulator modulates the second laser with the further electronic signal to form the quadrature amplitude modulated optical signal.

9. An apparatus for processing data, comprising:
   a plurality of first lasers, each first laser being configured to emit light at one of a plurality of frequencies;
   a plurality of modulators, each modulator corresponding to a respective one of the plurality of first lasers, each modulator being configured to receive a respective one of a plurality of binary electronic signals and to modulate the light emitted by the respective first laser; and
   a power combiner configured to combine the modulated light into an optical signal having one of a plurality of intensity levels, each intensity level being configured to represent a particular combination of bit values for the plurality of binary electronic signals;
   a photo receiver configured to receive the optical signal having the plurality of intensity levels and to output an electronic signal having the plurality of intensity levels; and
   an optical IQ (In-phase/Quadrature) modulator,
   wherein the optical IQ modulator receives the electronic signal and modulates a second laser with the electronic signal to form a quadrature amplitude modulated optical signal.

10. The apparatus of claim 9,
wherein the number of the plurality of first lasers is equal to or greater than the number of the plurality of binary electronic signals,
wherein each wavelength of the plurality of first lasers is separated from an adjacent wavelength by a respective frequency separation, and
wherein all of the respective frequency separations are greater than a bandwidth sensitivity of a photo receiver configured to receive the optical signal.

11. The apparatus of claim 9, further comprising:
an attenuator for at least one of the plurality of first lasers configured to adjust an intensity of the modulated light from the respective first laser.

12. The apparatus of claim 9, further comprising:
a delay adjuster for at least one of the plurality of first lasers configured to adjust a relative delay of the modulated light from the respective first laser.

13. An apparatus for transmitting data, comprising:
a plurality of modulators configured to receive a respective plurality of binary electronic signals;
a plurality of first lasers configured to emit light at a plurality of frequencies, the number of the plurality of first lasers corresponding to the number of the modulators, the light emitted by each of the plurality of first lasers being modulated by a respective one of the plurality of modulators;
a power combiner configured to combine the modulated light into an optical signal, the optical signal being configured to have one of a plurality of intensity levels, each intensity level being configured to represent a particular combination of bit values for the plurality of binary electronic signals;
a photo receiver configured to receive the optical signal having the plurality of intensity levels and to output an electronic signal having the plurality of intensity levels; and
an optical IQ (In-phase/Quadrature) modulator,
wherein the optical IQ modulator receives the electronic signal and modulates a second laser with the electronic signal to form a quadrature amplitude modulated optical signal.

14. The apparatus of claim 13,
wherein the photo receiver has a bandwidth sensitivity,
wherein each of the plurality of first lasers emits light having a wavelength separated from an adjacent wavelength by a respective frequency separation, and
wherein each of the respective frequency separations is greater than the bandwidth sensitivity.

15. The apparatus of claim 13, further comprising:
a further photo receiver outputting a further electronic signal having a further plurality of intensity levels,
wherein the further electronic signal is received by the optical IQ modulator,
wherein the further electronic signal represents a further particular combination of bit values for a further plurality of binary electronic signals, and
wherein the optical IQ modulator modulates the second laser with the further electronic signal to form the quadrature amplitude modulated optical signal.

* * * * *